SWITCHING CIRCUITRY FOR ISOLATING AN INPUT AND OUTPUT CIRCUIT UTILIZING A PLURALITY OF INSULATED GATE MAGNETIC OXIDE FIELD EFFECT TRANSISTORS

Filed Oct. 25, 1966

ENHANCEMENT IGMOSFET

DEPLETION IGMOSFET

INVENTOR.
JOSEPH GORMLEY
BY J. Donald Weber, Jr.
ATTORNEY.

United States Patent Office 3,509,375

Patented Apr. 28, 1970

3,509,375

SWITCHING CIRCUITRY FOR ISOLATING AN INPUT AND OUTPUT CIRCUIT UTILIZING A PLURALITY OF INSULATED GATE MAGNETIC OXIDE FIELD EFFECT TRANSISTORS

Joseph Gormley, Philadelphia County, Pa., assignor to Honeywell Inc., Minneapolis, Minn., a corporation of Delaware Filed Oct. 25, 1966, Ser. No. 589,447

Int. Cl. H03k *17/56*

U.S. Cl. 307—251 6 Claims

ABSTRACT OF THE DISCLOSURE

There is provided a switching circuit which is used between an amplifier circuit and a computer circuit in a DDC system for example. The switching circuit includes a plurality of field-effect transistors which are selectively switched by control signals. The computer is, thus, selectively connected to or isolated from the memory capacitor associated with the amplifier. Additionally, the memory capacitor is selectively isolated from or connected to the amplifier circuit.

This invention relates to a switching circuit. More particularly, the invention relates to a switching circuit using solid state components and which may be used in supervisory and/or direct digital control system.

More and more, the trend in industrial plants is toward automatic control systems, frequently termed supervisory or direct digital control (DDC) systems. In these types of systems, a computer, for example a digital computer, operates upon input information which is supplied by the operator or input information which is supplied via a feedback network to monitor an industrial process. The information supplied by the computer to the remaining portion of the circuit may be utilized to operate valves, solenoids or the like. To fully utilize the high speed digital computer control, it is frequently desirable to separate the process into a plurality of analog control loops. In each of these loops there may be included a control station which may include an amplifier. The amplifier provides control over the analog device in question. The individual loops are intermittently coupled to the digital computer circuitry for a brief time and then decoupled. The coupling time is sufficiently long to permit a transfer of information from the computer to the station, but sufficiently short to permit high speed accessing of a large number of stations by the computer.

One method of effecting the coupling between an amplifier and a computer is by means of a relay switch. Such a switching circuit is shown and described in a copending application entitled Electrical Apparatus, by W. F. Newbold, bearing Ser. No. 433,875 and assigned to the common assignee.

Certain disadvantages in the relay switching circuit are inherent in its structure. For example, relays include mechanical moving parts whereby relatively slow operation is obtained. In addition, the contacts are subject to problems such as contact bounce, arcing, pitting and the like. The subject invention obviates these difficulties by replacing the mechanical relay with an electrical circuit equivalent which operates faster, has no moving parts, and is not plagued by any mechanical short comings. In this invention, insulated gate metallic oxide semiconductor field effect transistors (IGMOSFET's) are utilized as the switching components. Additionally, the field effect transistors comprise pairs of enhancement and depletion field effect transistors of complementary conductivity type. Since the transistors are insulated gate types, control of conduction to the amplifier is easily and positively provided. Moreover, in the subject circuit, the input circuitry is isolated from the amplifier inputs whereby amplifier drift (due to signal changes in the input circuitry) is avoided.

Thus, one object of this invention is to provide a high speed switching circuit. Another object of this invention is to provide a switching circuit which eliminates mechanical problems. Another object of this invention is to provide an electrical switching circuit which is relatively simple in construction and which lends itself easily to solid state techniques. Another object of this invention is to provide a switching circuit which isolates an amplifier from a source thereby avoiding source induced amplifier drift.

These and other objects and advantages of this invention will become more readily apparent when the following description is read in conjunction with the attached drawings, in which.

Figure 1:
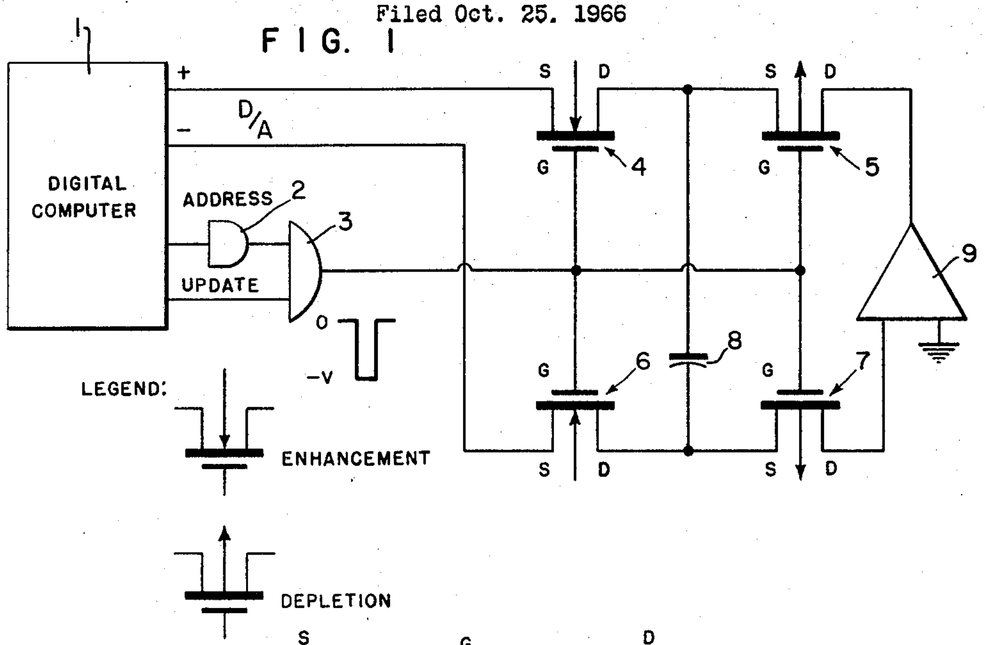
FIGURE 1 is a schematic diagram of a preferred embodiment of the invention.

Referring now to FIGURE 1, there is shown a schematic diagram of a preferred embodiment of the instant invention. In the circuit, a digital computer 1, which provides the overall control of a system, is connected to gate 2. The inputs to gate 2, which are supplied by digital computer 1, represent the ADDRESS information, for example. Thus, one or more connections may be made between the computer and gate 2 wherein a predetermined code will enable gate 2. Gate 3, which may be an AND gate, has the inputs thereof connected to the output of gate 2 and an output of computer 1, respectively. The output supplied by gate 2 provides an enabling signal which enables gate 3 only when the proper station loop is being addressed by the computer. The signal supplied by computer 1 is the UPDATE information which is to be applied to the circuit. When the enable signal (provided by gate 2) and the UPDATE signal are supplied concurrently, gate 3 is enabled. In the instant embodiment, gate 3, when enabled, provides a negative going signal which switches from a high level to a low level, for example from ground to —18 volts. This signal is applied to the gate electrodes of the field effect transistors 4, 5, 6 and 7.

Digital computer 1 also provides the signals labeled "+" and "—" from the digital to analog (D/A) converter network therein. These signals are provided to the source electrodes of FET's 4 and 6, respectively. The drain electrodes of FET's 4 and 6 are connected to the source electrodes of FET's 5 and 7, respectively. The drain electrodes of FET's 5 and 7 are connected to the output and input terminals of operational amplifier 9, respectively. The capacitor 8 is connected between the source electrodes of FET's 5 and 7.

The D/A converter signal is a level or analog signal which is provided by computer 1 and is ultimately, directed toward the operational amplifier 9. Operational amplifier 9 is any typical amplifier which is known in the art. Capacitor 8 is a memory capacitor which is alternatively connected to the output conductors of the D/A portion of computer 1 or in the feedback path across the input and output terminals of operational amplifier 9. FET's 4 and 6 are enhancement type insulated gate metallic oxide field effect transistors. Transistors 5 and 7 are, on the other hand, depletion type IGMOSFET's.

Figure 2:
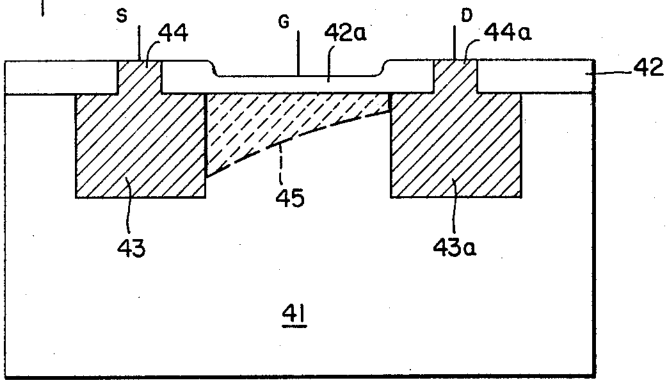
FIGURES 2 and 3 are diagrammatic showings of the semiconductors utilized in the circuit shown in FIGURE 1.
Figure 3:
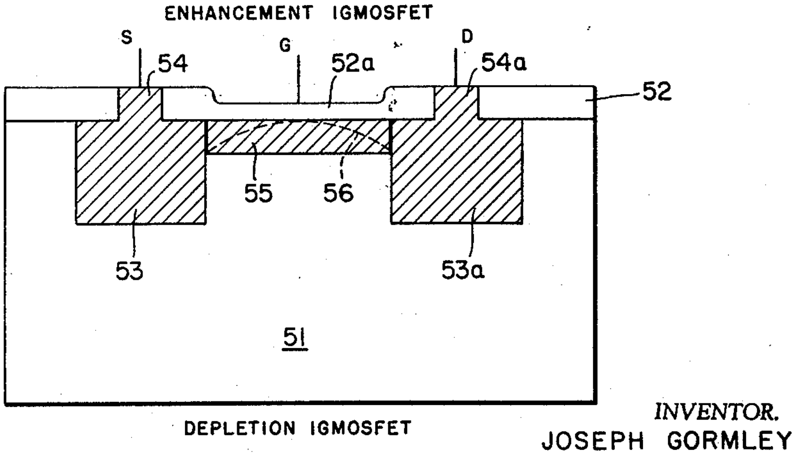

Referring now to FIGURES 2 and 3, a diagrammatic showing of enhancement type IGMOSFET and a depletion type IGMOSFET is presented, respectively. In FIGURE 2, the enhancement type IGMOSFET, such as is known in the art, comprises a bulk material 41 which may be either P or N type material. In the circuit shown in FIGURE 1, a P channel enhancement mode IGMOSFET is utilized. Consequently, the bulk material would be N type material in this embodiment. However, if the input signal polarity were reversed, an N channel IGMOSFET would be utilized. In an N channel IGMOSFET the bulk material 41 would be P type material.

In the P channel IGMOSFET, separate doped portions 43 and 43*a* are provided adjacent one surface of the bulk material 41. A thin layer 42 of $SiO_2$ is deposited on the surface of the component and covers the surface of the P material and the N material. Small through-contact areas 44 and 44*a* are provided whereby the source (S) and drain (D) electrodes are connected to the P type materials which, as shown, are separated by a spacer comprising N type material. The $SiO_2$ layer is reduced in thickness to the thinner portion 42*a* adjacent the surface of the N material and between the P material portions. The gate (G) electrode is connected to the FET at this depressed portion.

Initially, it is seen that a portion of the bulk material 41 fully separates the P type material sections. With the application of a negative signal (in the case of a P channel FET) a charge is developed across the $SiO_2$ dielectric wherein excess holes congregate adjacent the surface of the N material and in the channel between the P materials. Ultimately, the number of excess holes becomes sufficient that a path (shown by dashed line 45) joins the P type materials and permits conduction from the S electrode to the D electrode. Of course, with the removal of the gate (G) signal, the path between the P portions dissipates and the S and D electrodes are fully insulated one from the other.

Similarly, referring to FIGURE 3 the depletion IGMOSFET comprises a bulk material 51 with doped portions 53 and 53*a* of the oposite conductivity material. Again the S and D electrodes are connected to the doped portions 53 and 53*a* by means of contact areas and 54 and 54*a*, respectively. A $SiO_2$ layer 52 is deposited as before with a slightly thinned portion 52*a* connected to the gate electrode. Contrary to the enhancement type device, in the depletion IGMOSFET, a channel or current path 55 having the same conductivity type material as the doped materials 53 and 53*a* is provided as a bridge between the doped material areas. Thus, electrodes S and D are electrically connected and exhibit a substantially short circuit connection therebetween. With the application of the proper polarity gate signal at electrode G, a capacitor effect again occurs across the $SiO_2$ layer, whereby excess charge is developed. The excess charge operates upon bridge 55 so that it is, in effect, destroyed such that the doped portion 53 and 53*a* are electrically insulated one from the other.

Referring again to FIGURE 1, the operation of the circuit becomes more easily understood. Thus, in this invention FET's 5 and 7 are N type depletion elements while FET's 4 and 6 are P type enhancement elements. Obviously then, in the absence of a gate signal, FET's 4 and 6 are normally nonconductive and open circuited. Consequently, the D/A output terminals which are connected to the source electrodes of FET's 4 and 6 respectively, are disconnected from capacitor 8 and amplifier 9. Therefore, regardless of any variations in the D/A output, the input of amplifier 9 is not effected. Consequently, amplifier drift is eleminated.

On the contrary, FET's 5 and 7 are N type depletion elements whereby the S and D terminals or electrodes are short circuited and electrically conductive. Therefore, capacitor 8 is electrically connected across amplifier 9. Thus, when a zero signal (i.e. no signal) is supplied to the gate terminals of the FET's 4, 5, 6 and 7, FET's 4 and 6 are nonconductive and FET's 5 and 7 are conductive. Consequently, a circuit exists from the output of amplifier 9 through FET 5, through capacitor 8, through FET 7 to the input of amplifier 9. This circuit is the standard "HOLD" operating circuit in the typical DDC operation.

However, when computer 1 supplies an UPDATE signal along with the proper ADDRESS signal, gate 3 provides, in this embodiment, a low level or negative going signal. This signal, when applied to the gate electrodes of FET's 4 and 6, causes an enhancement effect on the enhancement type IGMOSFET's 4 and 6 whereby these FET's become conductive. At the same time, this low level signal is operative to deplete the bridge portion (e.g. bridge 55 in FIGURE 3) of the FET's 5 and 7 whereby these FET's become nonconductive. In this latter condition, the D/A is now connected from the plus (+) terminal, through FET 4, through capacitor 8, through FET 6 to the minus (−) terminal as indicated in FIGURE 1.

Thus, it is seen that in the absence of the gating signal, a parallel circuit comprising the capacitor 8 and amplifier 9 obtains. On the contrary, when the gating signal is applied, the D/A portion of the computer is connected in parallel with capacitor 8. In each of these operations, an exclusive connection is effected whereby the other portion of the circuit is positively disconnected. Thus, the advantage of the insulated gate metallic oxide semiconductor field effect transistors is utilized. That is, a positive decoupling and/or coupling occurs in accordance with the control signal or gating signal supplied. More particularly, in the specific embodiment shown, a positive connection between the memory capacitor 8 and amplifier 9 normally exists while the D/A portion of computer 1 system is decoupled from the amplifier. This latter effect eliminates the problem of amplifier drift when the D/A portion of the computer is connected to other amplifiers or otherwise varying in output. Because of the high speed switching which is obtainable through the use of FET's, this switching circuit provides faster switching than is possible with the standard relay switching device. In addition, other mechanical disadvantages are avoided.

The embodiment described supra represents a form C type of switching. By the expedient of removing IGMOSFET's 5 and 7 from the circuit, a form A type of switching may be effected. That is, semiconductors 4 and 6 still provide selective interconnection between the input means and capacitor 8 and amplifier 9. However, capacitor 8 is always electrically connected to amplifier 9 whereby positive decoupling of the output from the input during updating is not effected. Decoupling is not necessary for all purposes wherefore this modified circuit is utilizable.

Preferred embodiments of the invention are described. However, the scope of the invention is not to be limited thereby. Modifications of the invention may be made, for example in the polarities of voltages and the like. Those modifications which fall within the inventive concepts are meant to be included in this description.

The embodiments of the invention in which an exclusive property or privilege is claimed are defined as follows:

1. A switching circuit for isolating an output means from an input means comprising, a pair of semiconductors of the insulated gate metallic oxide field effect transistor type, said semiconductors each having at least three electrodes, said input means connected to one electrode of each of said semiconductors, said output means connected to a second electrode of each of said semiconductors, control means connected to a third electrode of each of said semiconductors to supply a signal which varies the conductive state of each of said semiconductors simultaneously, and energy storage means connected between said second electrodes of said semiconductors for storing a signal from said input means to be utilized by said output means when said semiconductors are nonconductive.

2. The switching circuit recited in claim 1 wherein said output means comprises an operational amplifier, and said energy storage means functions as a memory element which is intermittently connected to said input means via said pair of semiconductors.

3. In the switching circuit recited in claim 2, said energy storage means comprises a capacitor which is charged by said input means to indicate the condition of the input means when said semiconductors are rendered conductive in response to a signal from said control means.

4. The switching circuit recited in claim 1 including a second pair of semiconductors of the insulated gate metallic oxide field effect transistor type, said second pair of semiconductors connected between said output means and said energy storage means connected between said second electrodes of said first mentioned pair of semiconductors, said first and second pairs of semiconductors being of the opposite conductivity type, and said second pair of semiconductors connected to said control means such that one pair of semiconductors is conductive when the other pair is nonconductive for connecting said input means to said energy storage means and then connecting said output means thereto.

5. The switching circuit recited in claim 4, wherein said first mentioned pair of semiconductors comprises enhancement type semiconductors such that said first pair of semiconductors are nonconductive in the absence of a signal from said control means, and said second pair of semiconductors comprises depletion type semiconductors such that said second pair of semiconductors are conductive in the absence of a signal from said control means, said output means being electrically insulated from said input means in the absence of a signal from said control means whereby said output means does not drift in response to spurious variations at said input means.

6. A switching circuit comprising a pair of semiconductors of the insulated gate metallic oxide field effect transistor type, said semiconductors each having at least three electrodes, digital to analog computation circuit means connected to one electrode of each of said semiconductors, output means connected to a second electrode of each of said semiconductors, and gate means which produce a gating signal only upon the proper addressing thereof connected to a third electrode of each of said semiconductors to supply a signal which simultaneously varies the conductive state of each of said semiconductors for connecting said digital to analog computation circuit means to said output means.

References Cited

UNITED STATES PATENTS

| | | | |
|---|---|---|---|
| 3,289,102 | 11/1966 | Hayashi | 307—251 X |
| 3,327,133 | 6/1967 | Sickles | 307—251 |
| 3,387,358 | 6/1968 | Heiman | 307—235 X |

OTHER REFERENCES

Gulbenk et al.: How Modules Make Complex Design Simple, Electronics (magazine), December 1964 pp. (50–54).

DONALD D. FORRER, Primary Examiner

U.S. Cl. X.R.

307—203, 238, 246, 304